(12) United States Patent
Yamashita et al.

(10) Patent No.: US 10,592,983 B1
(45) Date of Patent: Mar. 17, 2020

(54) TASK SECURITY VERIFICATION AND CONSEQUENCE DETERMINATION FOR INTERNET LINKS

(71) Applicant: Capital One Services, LLC, McLean, VA (US)

(72) Inventors: Mark Yamashita, Toronto (CA); Sundeep Banait, Brampton (CA)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/367,929

(22) Filed: Mar. 28, 2019

(51) Int. Cl.
| | |
|---|---|
| G06F 21/00 | (2013.01) |
| G06Q 40/02 | (2012.01) |
| H04L 29/06 | (2006.01) |
| G06K 9/00 | (2006.01) |
| G06Q 50/26 | (2012.01) |

(52) U.S. Cl.
CPC ....... *G06Q 40/025* (2013.01); *G06K 9/00288* (2013.01); *G06Q 50/265* (2013.01); *H04L 63/083* (2013.01); *H04L 63/0861* (2013.01)

(58) Field of Classification Search
CPC ............... G06Q 40/025; G06Q 50/265; G06K 9/00288; H04L 63/083; H04L 63/0861
See application file for complete search history.

(56) References Cited

U.S. PATENT DOCUMENTS

| | | | |
|---|---|---|---|
| 6,098,052 A | 8/2000 | Kosiba et al. | |
| 7,970,676 B2 | 6/2011 | Feinstein | |
| 8,024,263 B2 | 9/2011 | Zarikian et al. | |
| 8,078,524 B2 | 12/2011 | Crawford et al. | |
| 8,515,842 B2 | 8/2013 | Papadimitriou | |
| 8,577,810 B1 * | 11/2013 | Dalit | G06F 21/32 705/1.1 |
| 8,799,150 B2 | 8/2014 | Annappindi | |
| 2003/0229580 A1 | 12/2003 | Gass et al. | |
| 2004/0199456 A1 | 10/2004 | Flint et al. | |
| 2007/0112668 A1 | 5/2007 | Celano et al. | |
| 2012/0066106 A1 * | 3/2012 | Papadimitriou | G06Q 40/00 705/35 |
| 2013/0036458 A1 * | 2/2013 | Liberman | H04L 9/3231 726/6 |
| 2013/0103571 A1 | 4/2013 | Chung et al. | |

* cited by examiner

*Primary Examiner* — Baotran N To
(74) *Attorney, Agent, or Firm* — Hunton Andrews Kurth LLP

(57) ABSTRACT

A user interface is provided for receiving instructions from a user to perform a computer related task (i.e., primary task). A module can run a primary process in the background on a first server to complete the task. Once the task is completed, the module can transmit the results to the user interface to display an output to the user. The user interface includes a button to enable the user to request information relating to a secondary process or task impacted by the primary task. By pressing the button, the user interface can submit a request to the first server or a second server to obtain information relating to the secondary process or task. In response, the user interface can receive a communication from the first or second server and display the information included in the communication to the user.

16 Claims, 4 Drawing Sheets

TASK SECURITY VERIFICATION AND CONSEQUENCE DETERMINATION FOR INTERNET LINKS

BACKGROUND

The Internet represents an insecure channel for exchanging information which leads to a high risk of intrusion or fraud, such as phishing, online viruses, trojans, worms and more. Many methods are used to protect the transfer of data, including encryption and from-the-ground-up engineering. Internet security is a branch of computer security related to the Internet, e.g., browser security, and network security as it applies to other applications or operating systems. An objective of internet security is to establish rules and measures to use against attacks over the Internet.

SUMMARY

An Internet security problem is that oftentimes a user provides input to a computer system through a website without knowing the technical consequences of providing the input. Specifically, when the user provides the input to the computer system, the computer system commits to a course of action (or task) which has certain consequences for the user, but the user is unaware of the consequences of the course of action. For example, in the context of entering a password for an online account, a user might make several unsuccessful attempts to enter the correct password. If the user makes too many unsuccessful attempts, the user's account can be locked. However, many users are unaware of the maximum number of allowable password attempts. In fact, if these users knew of the maximum number, they might have chosen not to try the incorrect passwords.

Similarly, in the context of resetting a user's password, a user might unwittingly ask a computer system to reset the user's password for an online account. However, the user might not understand the full consequences of resetting the user's password. For example, when a user asks a website to reset the user's password, the website can lock the user's account and transmit a reset email to the user to reset the password. Some websites limit the frequency of these emails, e.g., once every day. Yet, the user might not receive the email and as a result, the user's account can be locked for a day until the user can ask for another reset email. The user might decide not to ask the system to reset the user's password if the user knows that the account would be locked and that another reset email would not be sent to the user for some time. Instead, the user might seek to retrieve the password by other means, e.g., look up the user's notes to find the password.

These problems also appear in the context of Internet transactions. For example, in the context of applying for a credit card account, there can be adverse consequences on the user's credit score, regardless of whether the user's application is approved or denied. For example, if the user's application for a credit card is rejected, the user's credit score is lowered. Even if the user's application is approved, the user's credit score can still be impacted based on the credit limit approved for the account. For example, some credit reporting agencies, lower the user's credit score after an account is opened based on the credit limit of the account.

An objective of this disclosure is to provide a system and method which can facilitate user interactions with the Internet and web browsers by informing the user about the consequences of a user selection or choice on the Internet. In an example embodiment, a user interface is provided for receiving instructions from a user on a client device. The client device can provide the instructions to a first server including a module for performing a computer related task, e.g., access an account, reset a password, or open a credit card account. The module can run a primary process in the background on the first server to complete the task. Once the task is completed, the module can transmit the results to the user interface of the client device to display an output to the user. While performing the process or as a result of performing the process, the module can impact secondary processes or tasks, e.g., the user's account can be locked or the user's credit score can be adversely affected. However, it is not possible for the user to always determine these secondary processes or tasks. As a result, in an embodiment of this disclosure, the user interface includes a button, link or other surfing indicia to enable the user to request information relating to the secondary processes and tasks. By pressing the button (link or other surfing indicia), the user interface can submit a request to the first server or a second server to obtain information relating to the secondary processes or tasks. In response, the user interface can receive a communication from the first server or the second server and display the information included in the communication which relates to the secondary processes or tasks to the user.

DETAILED DESCRIPTION

Figure 1:
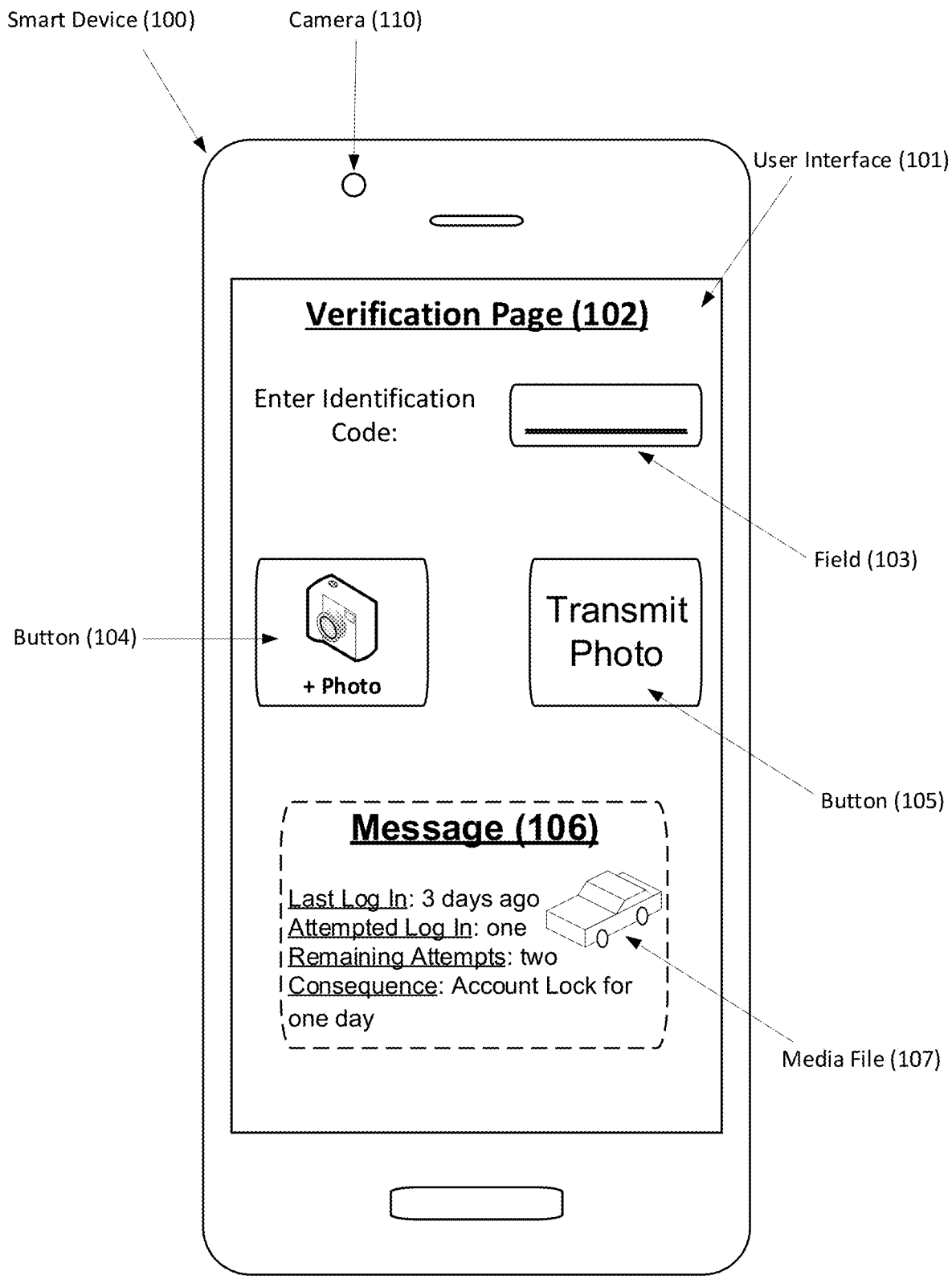
FIG. 1 shows an example smart device displaying a user interface for receiving an identification code.

This disclosure provides for a method and system which pertain to Internet processes. In one embodiment, a user can be informed about the consequences of entering the wrong password for an online account prior to user entering the password. In another embodiment, the user can be informed about the consequences of resetting the password for an online account. In yet another embodiment, the user can be informed about the consequences of an online transaction on the user's credit score.

Password Verification Embodiment

In an example embodiment, a smart device can display a user interface. The user interface can display various applications and software programs, and the user interface can facilitate the user's interaction with the applications and software programs. The user interface can also display a web browser, which can facilitate a user's interactions with various websites. Using the web browser, the user can visit a webpage of a website. The webpage can include one or more fields, buttons, icons, links or other tools for receiving input from a user.

In an example embodiment, the user interface can receive an identification code (or task or request) and the smart device can transmit the identification code (or task or request) to a server. Using the identification code, the server can identify the user. Specifically, the webpage can include a field for the user to enter the identification code of the user."

Once the user enters the user's identification code, the webpage can transmit the identification code to the server. In one embodiment, after entering the identification code, the user can take an action to indicate to the smart device that the user's identification code may be transmitted to the server. For example, the webpage can include a button or link and the user can take the action by clicking on the button or link. In another embodiment, the smart device can transmit the identification code without the user action. For example, the smart device can wait for a predetermined period of time after the user provides the user's last input and then the identification code is transmitted to the server, e.g., 5 seconds after entering the last letter or digit. Specifically, if the user does not provide any other input after the last letter or digit is provided, the smart device can automatically transmit the identification code to the server. As another example, the webpage can transmit the identification code if the user enters a specific combination in the identification code, e.g., the smart device automatically transmits the identification code if the user enters a star at the end of the identification code.

In an example embodiment, transmission of the identification code can be based on a setting defined in a user profile stored on the smart device. For example, the user profile can include a setting for the predetermined period of time that the smart device needs to wait. Thus, the transmission can take place after the smart device waits for the predetermined period of time defined by the user profile. In another example embodiment, the user profile can require the user to scan a biometric piece of information before the identification code can be transmitted to the server. For example, the user profile can require the user to scan the user's fingerprint or take a photo of the user before the identification code can be transmitted to the server. The smart device can optionally compare the fingerprint or the photo to a fingerprint or photo prestored on the smart device. If the fingerprint or the photo matches the prestored fingerprint or photo, the smart device can transmit the identification code to the server. The comparison process can include facial recognition or object recognition techniques which can identify a face or object in the photo and compare the face or object to the face or object included in the prestored photo.

In an example embodiment, the identification code can be a photo, media file or voice recording. For example, the webpage can include a link for taking a photo of the user. Once the user takes the photo, the user can instruct the smart device to transmit the photo to the server.

In one embodiment, the webpage can include a link or button for requesting information concerning a task to be performed by the server. For example, by pressing the button or link, the user can submit a request to the server or another server to obtain information concerning the task. For example, the task can be allowing a user to receive access to an online account after entering the password; resetting a password on a website; or opening a credit card account on the website. The information concerning the task can include information relating to the consequences of entering the wrong password or resetting the password (e.g., when will the account be locked or how long will the account remain locked) or opening the credit card account (e.g., how does opening the account affect the user's credit score).

In one embodiment, the request for information can be submitted prior to transmitting the identification code (or the task) to the server. In another embodiment, the request can be submitted simultaneous with or after the transmission of the identification code to the server. In one embodiment, the button (or link) for transmitting the user's identification code and the button (or link) for transmitting the request for information can be the same button (or link). In another embodiment, the button (or link) for transmitting the user's identification code and the button (or link) for transmitting the request for information are two different buttons (or links).

In response to receiving the request at the server, the server can determine a consequence for undertaking the task. Specifically, using the user's identification code, the server can search a database including information associated with the identification code and retrieve the information. The server can also transmit a message indicating the consequence to the smart device of the user. Once the smart device receives the communication, the smart device can display the message in the user interface of the smart device.

FIG. 1 shows an example smart device 100 displaying a user interface 101 for receiving a verification code. In this example embodiment, the user interface 101 can display a verification page 102 which includes a field 103 for entering an identification code, a button 104 for taking a photo of the user, and a button 105 for transmitting the photo or identification code to a server. The user can press the button 104, and in response to pressing the button 104, the processor of the smart device 100 can activate a camera 110 to take a photo of the user. The processor can also take a photo of the user and store the photo in a memory of the smart device 100. In response to pressing the button 105, the smart device 100 can transmit the photo to the server. In one embodiment, the smart device 100 stores a user profile which includes a prestored photo (or media file) of the user or an object. In response to pressing the button 105, the smart device 100 transmits the photo only if the photo is of the same person or object as the person or object depicted in the prestored photo (or media file). The smart device 100 can use a facial or object recognition module to make this determination.

Once the server receives the photo, the server can analyze the photo and using a facial recognition module, the server can identify an identification number or account number for the user. Using this identification number, the server can look up an account information for the user. Specifically, the server can obtain information indicating how many times the user has entered a password over a predetermined period of time and how many of these passwords were inaccurate. The server can also obtain information pertaining to the last time the user received access to the account. The server can also obtain other information. For example, the server can look up a media file associated with the user's account, e.g., a media file that the user selected when the user opened up the account. The server can also obtain information relating to the last IP address the user used to log into the account or how long the user stayed logged in. The server can transmit this information (i.e., the looked-up information) in a message 106 or a communication to the smart device 100.

The smart device 100 can receive the transmitted message and display some or all of the content of the message 106 to the user. For example, in this example embodiment, the user interface 101 can display that the user last logged into the account 3 days ago, and since then, the user has tried to log in once. Additionally, the user interface 101 can display that the user has two attempts left, and that if the user exceeds these attempts, the user's account will be locked for a day. The user interface 101 is also displaying a media file 107. Using this information, the user can decide whether to try logging in one more time.

Password Recovery Embodiment

In an example embodiment, a user can visit a webpage which can include a field for entering a username and a field for entering a password. Upon entering and submitting a correct username and password, the user can access an online account for the user. The webpage can also include a link for resetting the user's password. In this example embodiment, the link is set up such that when the link is activated the first time, the user is displayed a message relating to the procedure for resetting the password, and if the link is activated the second time, the user will be navigated to a second webpage which can assist the user in resetting the password.

Figure 2:
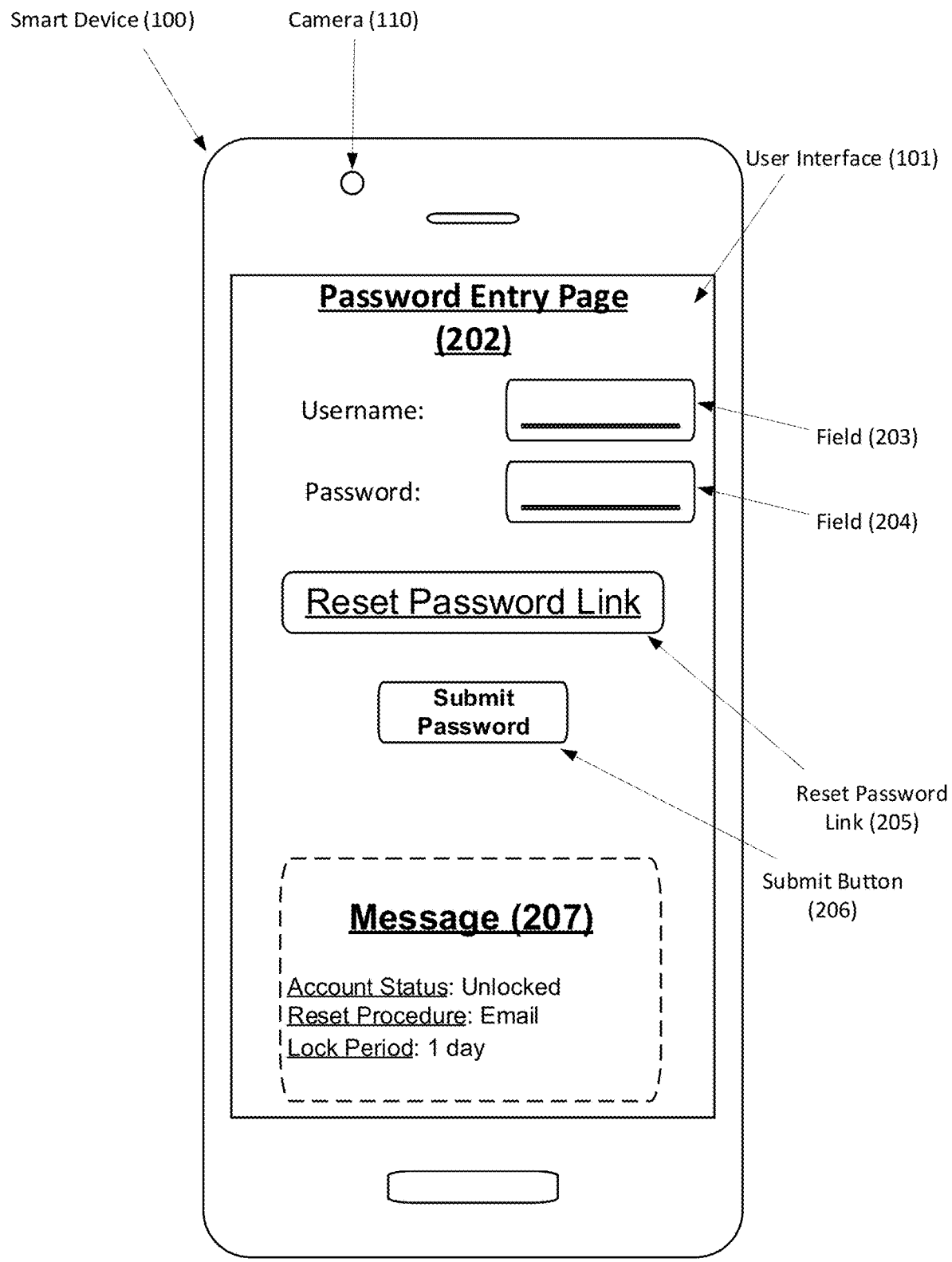
FIG. 2 shows the smart device displaying a page for resetting a password of an account.

FIG. 2 shows the smart device 100 displaying a password entry page 202 for resetting a password of an account. In this example embodiment, the user can enter a username and password in the fields 203 and 204, respectively. The page 202 also includes a reset password link 205 and a submit button 206.

When the user types the user's username in the field 203 and clicks on the reset password link 205, the smart device 100 transmits a request to a server. The request can include the username and ask for information pertaining to the user's account. In response to receiving the request, the server can look up information relating to the username. For example, the server can look up information as to whether the account is locked and what happens if the user resets the password. The server can transmit this information as a message to the smart device 100. Once the smart device 100 receives the message, the user interface 101 can display the message. For example, the user interface 101 can display a message 207 which indicates that the account is unlocked; that the reset procedure can be performed via email; and that if the user requests a reset of the account without actually resetting the account, the account can be locked for one day. Based on this information, the user can decide whether to proceed with resetting the password. For example, if the user presses the reset password link 205 for a second time, the user interface can display another page which indicates that a reset email has been sent to the user.

Credit Card Application Embodiment

In an example embodiment, a website or a software application for a financial institution is provided. The website can include a webpage for applying for a credit card (or the software application can include a page for applying for a credit card). Oftentimes, users are apprehensive about submitting credit card applications or opening new credit card accounts because credit decisions by financial institutions can adversely affect the users' respective credit scores. For example, a credit card denial decision by the financial institution can lower the user's credit score. Similarly, even if the financial institution issues a credit card to the user, the user's credit score can still be impacted. For example, one factor that can determine how much the credit score of the user will be impacted is the credit limit for the card. As part of the credit card application process, some financial institutions allow a user to specify a credit limit for the applied-for credit card. It can be beneficial for the user to evaluate the impact of the requested credit limit before applying for the credit limit. Similarly, it can be beneficial for the user to understand the impact of opening the credit card account before actually opening the account.

In an example embodiment, the financial institution's website can include a webpage for submitting a credit card application. The page can include several fields for obtaining the user's information. This information can include biographical information as well as credit specific information. For example, the biographical information can include the user's name, address, social security number, date of birth, etc., and the credit specific information can include credit card name, credit limit for the card, etc. The webpage can also include a submit button or link for submitting the application and a simulation button or link for evaluating a credit impact on the user's credit score if the user's application is approved. In some embodiments, the webpage can include a button for submitting one or more applications based on the information provided by the user, i.e., the biographical and credit specific information.

In an example embodiment, the user can provide the requested information on the webpage through a user interface of the user's smart device. The request information can include biographical information and credit specific information. Once the user clicks on the simulation button, the smart device can transmit the user's biographical information and credit specific information to a server. The server can be in communication with a simulation module, and the server can provide the user's biographical information and credit specific information to the simulation module. The simulation module can calculate a present credit score for the user based on the biographical information received from the user. The simulation module can also calculate a predicted credit score based on the user's biographical information as well as the credit specific information. Subsequently, the simulation module can transmit the present and predicted credit scores to the server, and the server can transmit this information to the smart device of the user. The user's smart device can receive this information and display it in the graphical user interface.

In an example embodiment, the biographical information can include one or more of the following: the person's full name, date of birth, nationality or country of residence, occupation or profession, past occupation or profession, level of education, username for an account, password for the account, a photo of the user, a fingerprint of the user, a voice recording of the user, a video of the user making a gesture or reading a text, and a media file.

In an example embodiment, the credit specific information can include one or more of the following: a credit card name (to be applied for by the user), a credit card type (to be applied for by the user), a balance to be transferred (to a credit card), a loan to be obtained, a balance to be lowered on a specific credit card (already owned by the user), a balance to be increased on a specific credit card (already owned by the user), an inquiry to be made on the user's credit file, maintaining on-time payments for a specified period of time, raising the credit limit on a specific credit card (already owned by the user), allowing a specific credit card to be delinquent, allowing every credit card to be delinquent, eliminating balance on a specific card, canceling a credit card, adding a public record to the user's credit file (e.g., foreclosure, child support, wage garnishment, bankruptcy), and allowing a revolving account to go into collection.

Figure 3:
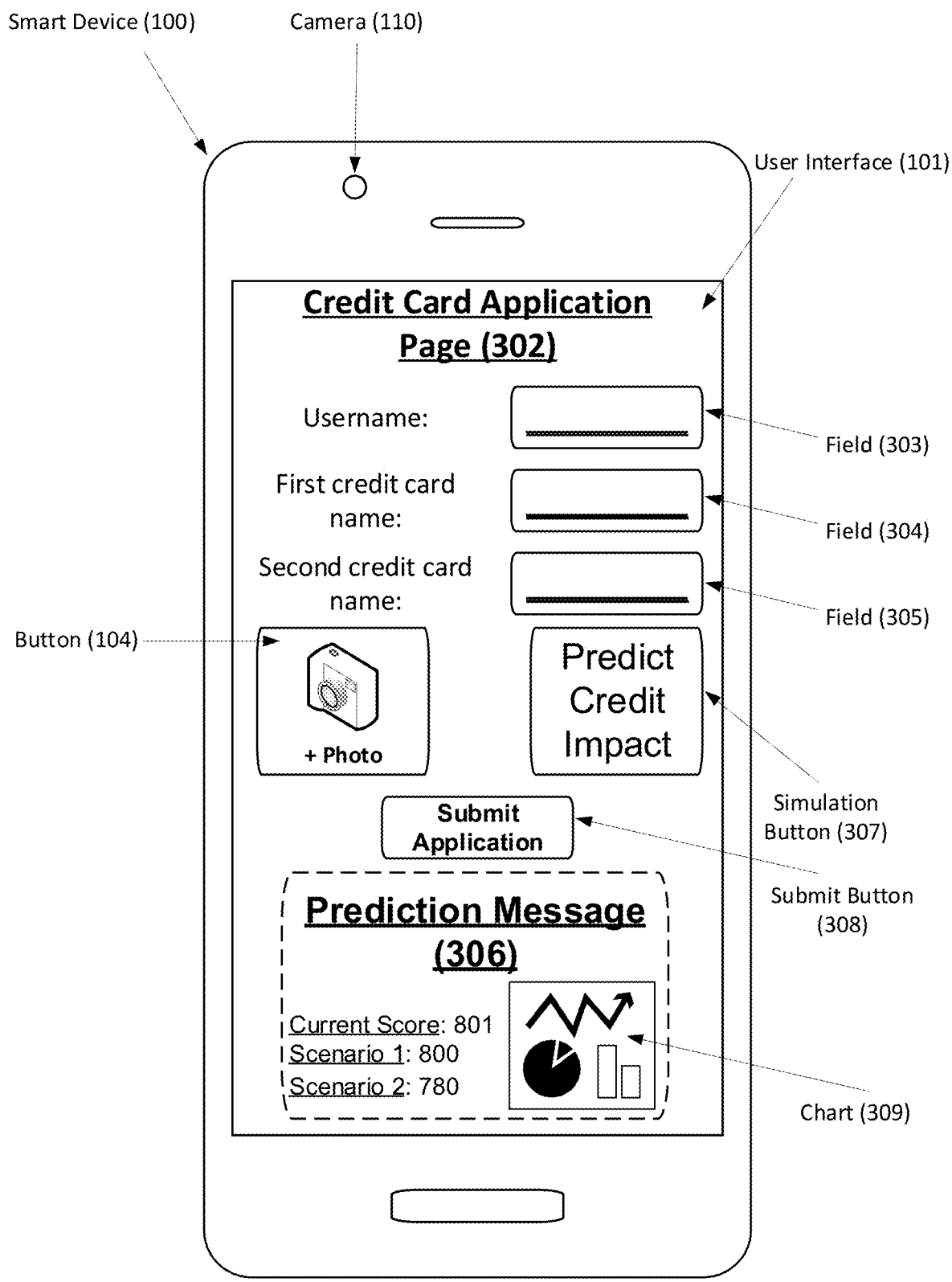
FIG. 3 shows a webpage for submitting a credit card application including a simulation button according to an example embodiment.

FIG. 3 shows a webpage 302 for submitting a credit card application including a simulation button 307 according to an example embodiment. In this example embodiment, the credit card application page 302 is displayed in the user interface 101 of the smart device 100. The page 302 includes a field 303 for receiving a user's username, a field 304 for receiving a user's first desired credit card name, and a field 305 for receiving a second desired credit card name. The page 302 also includes a button 104 for taking a photo of the user using the camera 110.

In one embodiment, the user can press the button 104 so that the smart device 100 takes a photo of the user. The user can also identify the first desired credit card name and the second desired credit card name in the fields 304 and 305, respectively. The user can press the simulation button 307. Once this button is pressed, the smart device 100 can transmit the photo and the identified desired credit cards to a server, and the server can communicate this information to one or more modules for analyzing the photo and the identified desired credit cards. The one or more modules can be software programs on the server or other servers.

For example, a first module can use facial recognition technology to identify the user. The module can also obtain biographical information of the user once the module identifies the user, e.g., by looking up a database including the user's biographical information such as social security number. A second module can calculate or obtain the user's present credit score using the biographical information obtained by the first module. The second module can also calculate a predicted credit score assuming that the user opens the first desired credit card and a predicted credit score assuming that the user opens the second desired credit card. The first module and the second module can communicate the two predicted scores to the server and the server can transmit the predicted scores to the smart device 100. The smart device 100 can display the predicted scores in the user interface 101. For example, the user interface 101 can display a prediction message 306 including the user's present credit score, the user's predicted credit score if the user opens the first desired credit card and the user's predicted credit score if the user opens the second desired credit card. The user interface 101 can also display a chart 309 displaying the impact of each of the credit cards on the user's credit score, e.g., the user's score when the first desired credit card is opened versus the user's score when the second desired credit card is opened.

In an example embodiment, the server can calculate a predicted credit score for the user if the user's application is rejected for a credit card. For example, if the user submits a desired first credit card, the server can calculate a predicted credit score for the case when the user is approved for the first desired credit card and a predicted credit score for the case when the user is rejected for the first desired credit card. The server can transmit this information to the smart device and the smart device can display this information to the user.

In one embodiment, the user can press the submit button 308, and when the user presses this button, the user interface 101 submits the user's application to the server. For example, if the user presses the button 308, the user interface can submit the user's application for the first desired credit card (identified in field 304), the second desired credit card (identified in field 305), or both.

Although the example embodiments described in connection with FIG. 3 are related to credit card application, this disclosure is not limited to credit cards. One of ordinary skill in the art recognizes that the teachings herein can be expanded to other credit decisions, e.g., loans, mortgages, car loans, etc.

Technical Implementation of a Smart Device or a Server

Figure 4:
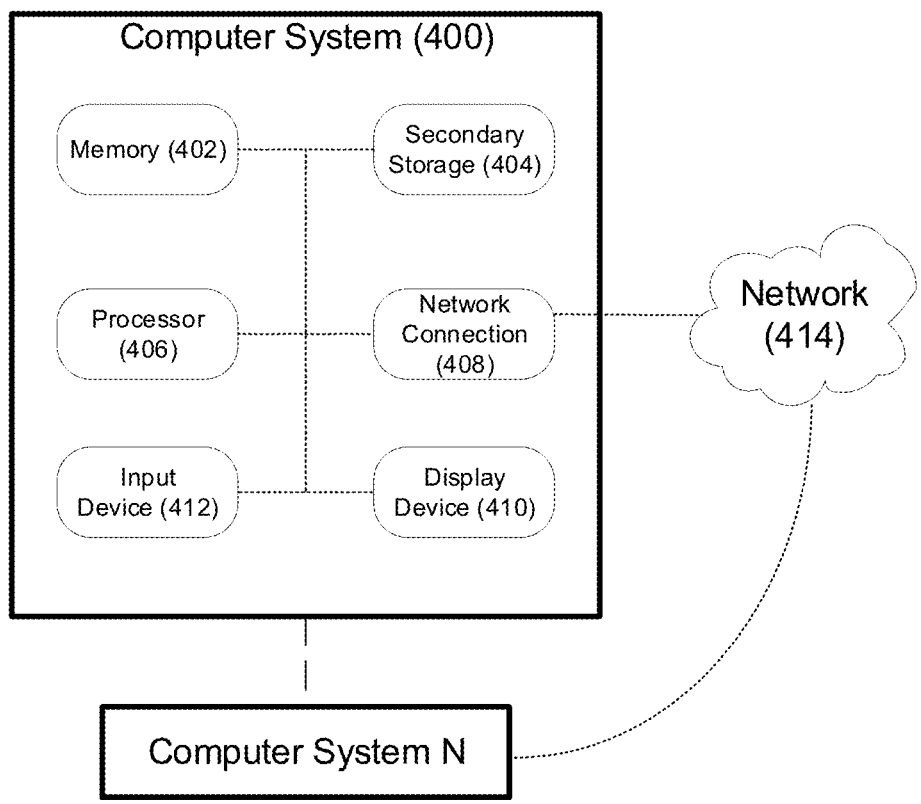
FIG. 4 illustrates exemplary hardware components for a processing unit.

FIG. 4 illustrates exemplary hardware components of a smart device or a server. A computer system 400, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 400, may run an application (or software) and perform the steps and functionalities described above. Computer system 400 may connect to a network 414, e.g., Internet, or other network, to receive inquires, obtain data, and transmit information and incentives as described above.

The computer system 400 typically includes a memory 402, a secondary storage device 404, and a processor 406. The computer system 400 may also include a plurality of processors 406 and be configured as a plurality of, e.g., bladed servers, or other known server configurations. The computer system 400 may also include a network connection device 408, a display device 410, and an input device 412.

The memory 402 may include RAM or similar types of memory, and it may store one or more applications for execution by processor 406. Secondary storage device 404 may include a hard disk drive, floppy disk drive, CD-ROM drive, or other types of non-volatile data storage. Processor 406 executes the application(s), such as those described herein, which are stored in memory 402 or secondary storage 404, or received from the Internet or other network 414. The processing by processor 406 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 400 may store one or more database structures in the secondary storage 404, for example, for storing and maintaining the information necessary to perform the above-described functions. Alternatively, such information may be in storage devices separate from these components.

Also, as noted, processor 406 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 400.

The input device 412 may include any device for entering information into the computer system 400, such as a touch-screen, keyboard, mouse, cursor-control device, microphone, digital camera, video recorder or camcorder. The input and output device 412 may be used to enter information into GUIs during performance of the methods described above. The display device 410 may include any type of device for presenting visual information such as, for example, a computer monitor or flat-screen display (or mobile device screen). The display device 410 may display the GUIs and/or output from sub-system components (or software).

Examples of the computer system 400 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 400 is shown in detail, system 400 may use multiple computer systems or servers as necessary or desired to support the users and may also use back-up or redundant servers to prevent network downtime in the event of a failure of a particular server. In addition, although computer system 400 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 400, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
   displaying a graphical user interface in a smart device, wherein the graphical user interface includes:
      a field for receiving an identification code;
      a first button for activating a camera of the smart device to take a photo; and
      a second button for transmitting the photo and a request to a server;
   taking the photo using the camera of the smart device in response to a first pressing of the first button for activating the camera;
   transmitting the photo and the request to the server in response to a second pressing of the second button for transmitting the photo and the request, wherein the request includes the identification code;
   receiving a message from the server, wherein the message includes a simulation credit score determined based on the identification code;
   displaying the message in the user interface;
   wherein the request is configured to trigger the server to obtain the simulation credit score based on the identification code and by matching the photo to another photo stored in a database of the server.

2. The method of claim 1, wherein the identification code is at least one of a credit card name, a credit card type and a credit card limit.

3. The method of claim 2, wherein the message is configured to cause the server determine a social security number based on the photo.

4. The method of claim 3, wherein the message is configured to cause the server use a facial recognition software application to determine the social security number for the user.

5. The method of claim 3, wherein the message is configured to cause the server to calculate a credit score as the simulation credit score.

6. The method of claim 5, wherein the credit score is a present credit score calculated based on an identity of a user associated with the photo.

7. The method of claim 6, wherein the identity of the user is a social security number.

8. The method of claim 5, wherein the credit score is a prediction credit score calculated based on the identification code.

9. The method of claim 8, wherein the identity of the user is a social security number.

10. The method of claim 8, wherein the request includes instructions for calculating the prediction credit score based on a credit event.

11. The method of claim 10, wherein the credit event is maintaining on-time payments for a specified period of time.

12. A method comprising:
    receiving, from a smart device, a photo and a request at a server, wherein the request includes an identification code;
    transmitting a message from the server to the smart device, wherein:
       the message includes a simulation credit score determined based on the identification code and by matching the photo to another photo stored in a database of the server;
       the server uses a facial recognition technique to identify a user depicted in the photo; and
       the simulation credit score is determined based on personal information associated with the user.

13. The method of claim 12, wherein the request includes credit specific information.

14. The method of claim 13, wherein the credit specific information is at least one of a credit card name, credit card type and credit card limit.

15. The method of claim 14, wherein the server is configured to determine a social security number for the user based on the photo.

16. The method of claim 15, wherein the server is configured to calculate a credit score change based on the social security number and the identification code.

* * * * *